(12) United States Patent
Nemoto et al.

(10) Patent No.: US 8,298,688 B2
(45) Date of Patent: Oct. 30, 2012

(54) MAGNETIC RECORDING MEDIUM USING LAYERS HAVING HIGHER- AND LOWER-$H_K$ ANISOTROPIC MAGNETIC FIELDS

(75) Inventors: Hiroaki Nemoto, Odawara (JP);
Kiwamu Tanahashi, Kokubunji (JP);
Hiroyuki Nakagawa, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 31 days.

(21) Appl. No.: 12/938,214

(22) Filed: Nov. 2, 2010

(65) Prior Publication Data
US 2011/0122525 A1 May 26, 2011

(30) Foreign Application Priority Data
Nov. 26, 2009 (JP) .................................. 2009-268910

(51) Int. Cl.
*G11B 5/66* (2006.01)
(52) U.S. Cl. ........................................................ 428/827
(58) Field of Classification Search .................. None
See application file for complete search history.

(56) References Cited

U.S. PATENT DOCUMENTS

| | | | |
|---|---|---|---|
| 6,468,670 B1 * | 10/2002 | Ikeda et al. | 428/611 |
| 7,691,500 B2 | 4/2010 | Shimizu et al. | |
| 2004/0253485 A1 * | 12/2004 | Nolan | 428/694 T |
| 2005/0142378 A1 | 6/2005 | Nemoto et al. | |
| 2007/0172706 A1 * | 7/2007 | Chen | 428/832 |
| 2007/0285839 A1 | 12/2007 | Suzuki et al. | |
| 2009/0011281 A1 * | 1/2009 | Oikawa et al. | 428/812 |
| 2009/0142624 A1 * | 6/2009 | Takahoshi et al. | 428/846.6 |

FOREIGN PATENT DOCUMENTS

| | | |
|---|---|---|
| JP | 2007-273049 A | 10/1920 |
| JP | 2003-346335 | 12/2003 |
| JP | 2005-190538 | 7/2005 |
| JP | 2006-120290 A2 | 5/2006 |
| JP | 2007-273050 A | 10/2007 |

(Continued)

OTHER PUBLICATIONS

H. Nemoto et al., "Designing Magnetics of Capped Perpendicular Media with Minor-Loop Analysis," © 2008 Elsevier B.V., Journal of Magnetism and Magnetic Materials, vol. 320, Aug. 12, 2008, pp. 3144-3150.

(Continued)

*Primary Examiner* — Holly Rickman
*Assistant Examiner* — Linda Chau
(74) *Attorney, Agent, or Firm* — Zilka-Kotab, PC (57) ABSTRACT

According to one embodiment, a magnetic recording medium includes a magnetic recording layer formed above a substrate, comprising: a first magnetic layer formed from a $[Co/Pt]_n$ multilayered film, wherein the first magnetic layer has a face-centered cubic (fcc) (111) crystal structure, the (111) direction being perpendicular to a film surface thereof, and a second magnetic layer comprising a CoCrPt or CoCrPt alloy film formed above the first magnetic layer, wherein the second magnetic layer has a hexagonal close packed (hcp) (00.1) crystal structure, the (00.1) direction being perpendicular to a film surface thereof. According to another embodiment, a system includes a magnetic recording medium as described above, a magnetic head for reading from and/or writing to the magnetic recording medium, a magnetic head slider for supporting the magnetic head, and a control unit coupled to the magnetic head for controlling operation of the magnetic head.

24 Claims, 10 Drawing Sheets

FOREIGN PATENT DOCUMENTS

JP  2009-070444 A  4/2009

OTHER PUBLICATIONS

Victora et al., "Composite Media for Perpendicular Magnetic Recording," © 2005 IEEE, IEEE Transactions on Magnetics, vol. 41, No. 2, Feb. 2005, p. 537-542.

Tanahashi et at, "Dual Segregant Perpendicular Recording Media With Graded Properties," © 2009 IEEE, IEEE Transactions on Magnetics, vol. 45, No. 2, Feb. 2009, p. 799-864.

Nemoto et al., "Ultrahigh-$H_c$ granular media with $[CoB/Pt]_n$ multilayer film sputtered under $Ar+O_2$ atmosphere," © 2009 American Institute of Physics, Journal of Applied Physics, vol. 105, Downloaded May 26, 2010. p. 1-3.

Nemoto et al,, "Analysis of interfacial magnetic anisotropy in Co/Pt and Co/Pd multilayer films," © 2005 American Institute of Physics, Journal of Applied Physics, vol. 97, Downloaded May 26, 2010 p, 1-3.

* cited by examiner

[Co/Pt]ₙ + Boron oxide

MAGNETIC RECORDING MEDIUM USING LAYERS HAVING HIGHER- AND LOWER-$H_K$ ANISOTROPIC MAGNETIC FIELDS

RELATED APPLICATIONS

The present application claims priority to a Japanese Patent Application filed Nov. 26, 2009, under Appl. No. 2009-268910, which is incorporated herein by reference.

FIELD OF THE INVENTION

The present invention relates to a perpendicular magnetic recording medium having layers having higher- and lower-$H_k$ used in a perpendicular magnetic recording and playback device.

BACKGROUND OF THE INVENTION

The heart of a computer is a magnetic disk drive which typically includes a rotating disk, a slider that has read and write heads, a suspension arm above the rotating disk and an actuator arm that swings the suspension arm to place the read and/or write heads over selected circular tracks on the rotating disk. When the slider rides on the air bearing, the write and read heads are employed for writing magnetic impressions to, and reading magnetic signal fields from, the rotating disk. The read and write heads are connected to processing circuitry that operates according to a computer program to implement the writing and reading functions.

The hard disk drive (HDD) is an indispensable device in applications that require the recording of large amounts of information on computers or consumer electronics. The rapid increase in the volume of data handled by computers has seen a rising demand for an increase in the capacity of HDDs as an auxiliary or primary storage device. Moreover, with the increased use of HDDs in domestic electrical appliances, there is a strong demand for enhanced capacity and reduced size in HDDs.

In typical systems, the magnetic recording medium used in HDDs comprises a plurality of perpendicular magnetic layers having different anisotropic magnetic fields $H_k$. This Exchange-Coupled Composite (ECC) structure may mitigate loss of recorded magnetization state due to noise in the medium, and has been employed in this manner in *IEEE Trans. Magn.*, vol. 41, p. 537 (2005) and *IEEE Trans. Magn.*, vol. 45, p. 799 (2009).

A CoCrPt alloy thin film was fabricated having various compositions and the anisotropic magnetic field $H_k$ of the films was measured. Experimental results show that CoCrPt alloy thin films have a maximum $H_k$ magnitude of 22 kOe. Weaker anisotropic magnetic fields destabilize magnetization in the direction perpendicular to the film surface. Thus, by only using a CoCrPt alloy, it becomes increasingly difficult to increase the difference in the anisotropic magnetic field $H_k$ between the magnetic layers forming the magnetic recording layer. Generally, a large gain is obtained for a larger difference in the anisotropic magnetic field $H_k$ between the magnetic layers which are combined in the ECC medium. When the medium is fabricated from only CoCrPt alloy as is typical in the art, there are constraints on the obtainable difference in anisotropic magnetic field between magnetic layers. Therefore, there is a need for developing a system and method for increasing the storage capacity of HDDs while overcoming the limitations of conventional media.

SUMMARY OF THE INVENTION

According to one embodiment, a magnetic recording medium includes a magnetic recording layer formed above a substrate. The magnetic recording layer includes a first magnetic layer formed from a $[Co/Pt]_n$ multilayered film, wherein the first magnetic layer has a face-centered cubic (fcc) (111) crystal structure, the (111) direction being perpendicular to a film surface thereof, and a second magnetic layer formed above the first magnetic layer, the second magnetic layer being formed from a CoCrPt alloy film, wherein the second magnetic layer has a hexagonal close packed (hcp) (00.1) crystal structure, the (00.1) direction being perpendicular to a film surface thereof.

According to another embodiment, a system includes a magnetic recording medium as described above, a magnetic head for reading from and/or writing to the magnetic recording medium, a magnetic head slider for supporting the magnetic head, and a control unit coupled to the magnetic head for controlling operation of the magnetic head.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein may be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to a general embodiment, a magnetic recording medium includes a magnetic recording layer formed above a substrate. The magnetic recording layer includes a first magnetic layer formed from a $[Co/Pt]_n$ multilayered film, wherein the first magnetic layer has a face-centered cubic (fcc) (111) crystal structure, the (111) direction being perpendicular to a film surface thereof, and a second magnetic layer formed above the first magnetic layer, the second magnetic layer being formed from a CoCrPt film or a CoCrPt alloy film, wherein the second magnetic layer has a hexagonal close packed (hcp) (00.1) crystal structure, the (00.1) direction being perpendicular to a film surface thereof.

According to another general embodiment, a system includes a magnetic recording medium as described above, a magnetic head for reading from and/or writing to the magnetic recording medium, a magnetic head slider for supporting the magnetic head, and a control unit coupled to the magnetic head for controlling operation of the magnetic head.

A proposed structure of the medium used for perpendicular magnetic recording, according to one embodiment, is a magnetic recording layer which comprises a plurality of perpendicular magnetic layers having different anisotropic magnetic fields $H_k$. A medium using this structure is referred to as an Exchange-Coupled Composite (ECC) medium or an Exchange-Spring (ES) medium. An advantage of an ECC medium over other types of media is that the magnetic field of the head used for recording may be reduced when a material having a large anisotropic magnetic field $H_k$ is used in a portion of the medium. By using a material having a large anisotropic magnetic field $H_k$, the loss of the recorded magnetized state due to noise may be prevented or minimized. In addition, the demand for increasing the magnetic field of the recording head, which is a very difficult problem, is mitigated by the reduction in the recording magnetic field used.

The detailed studies were conducted in order to apply the $[Co/Pt]_n$ multilayered film having the granular structure to the ECC medium. The results showed that by forming a recording film having the layered structure and layer thicknesses as described below, the $[Co/Pt]_n$ multilayered film may be effectively used and the recording and playback characteristics of the ECC medium improved, according to and using various embodiments.

A representative magnetic recording medium may be comprised of a soft magnetic backing layer, an intermediate layer, a magnetic recording layer, and a protective layer sequentially formed on a substrate, according to one embodiment, and may be an ECC medium where positioning the high-$H_k$ magnetic layer formed from a $[Co/Pt]_n$ multilayered film on the substrate side and the low-$H_k$ magnetic field layer formed from the CoCrPt film or the CoCrPt alloy film on the medium surface side in the magnetic recording layer causes exchange coupling between the high-$H_k$ magnetic layer and the low-$H_k$ magnetic layer.

The soft magnetic backing layer, according to one embodiment, guides the magnetic field from the recording head into the interior from the recording medium surface, and may use magnetic films having soft magnetic characteristics individually or in combination. The intermediate layer may be a non-magnetic layer inserted between the soft magnetic backing layer and the magnetic recording layer. In particular, the material composition and the layered structure are selected in order to control the crystal orientation characteristic of the magnetic recording layer and the microstructure of the magnetic recording layer. The protective layer mechanically and chemically protects the entire recording film and may be a thin film having carbon as a main component, according to one embodiment. In addition, the lubricating film may be formed by coating a thin coat of a perfluoropolyether (PFPE) lubricant on the protective film. The carbon thin film has the hardness mechanical characteristics typical of a diamond structure, in one approach. The lubricating film reduces the surface energy of the recording film surface and improves the abrasion resistance of the recording film surface.

According to one embodiment, the $[Co/Pt]_n$ multilayered film, which is the high-$H_k$ magnetic layer, is substantially a crystal lattice having a face-centered cubic (fcc) structure, and the (111) direction is perpendicular to the film surface. With this crystal orientation, the CoCrPt film or the CoCrPt alloy film formed as the low-$H_k$ magnetic layer in the top part of the $[Co/Pt]_n$ multilayered film takes on the preferred crystal orientation, and the desired characteristics as a perpendicular recording film are obtained, according to one embodiment.

The granular layer comprising the CoCrPt film or the CoCrPt alloy film is formed as the low-$H_k$ magnetic layer close to the medium surface side of the high-$H_k$ magnetic layer. Because the fcc (111) crystal surface on the high-$H_k$ magnetic layer is exposed, the CoCrPt film or the CoCrPt alloy film having the crystal lattice of a hexagonal close packed (hcp) structure is formed by (hetero) epitaxial growth so that the (00.1) film surface becomes parallel to the substrate surface, according to one embodiment. Thus, good perpendicular magnetic anisotropy is exhibited in the low-$H_k$ magnetic layer. The structure may place the high-$H_k$ magnetic layer and the low-$H_k$ magnetic layer in direct contact, or may interpose a thin magnetic layer in order to appropriately adjust the exchange coupling. However, when the thin magnetic film is interposed, materials should be appropriately selected so that the epitaxial growth between the high-$H_k$ magnetic layer and the low-$H_k$ magnetic layer is not obstructed, according to one embodiment.

Furthermore, the high-$H_k$ magnetic layer and the low-$H_k$ magnetic layer may feature a structure (granular structure) in which the magnetic fine grains are separated by boundaries composed of non-metallic materials, and the formation positions of the crystal boundaries between the high-$H_k$ magnetic layer and the low-$H_k$ magnetic layer may be connected, according to one embodiment. In this case, because the boundary surface is formed by the high-$H_k$ part and the low-$H_k$ part on a one-to-one basis for one magnetic fine grain, a unique effect may be obtained in the ECC medium by the exchange coupling which acts between the high-$H_k$ part and the low-$H_k$ part, according to one embodiment.

Metal oxides and nitrides are useful as the non-metallic materials for forming the boundaries. The results of many studies on the CoCrPt film or the CoCrPt alloy film have been reported. The oxides of Al, Cr, Hf, Mg, Nb, Si, Ta, Ti, V, Zr, etc., and preferably the oxides of Si, Ti, Ta, easily realize good recording and playback characteristics. Because the $[Co/Pt]_n$ multilayered film has main components of Co and Pt forming the magnetic fine grains, good effects may be obtained by applying oxides similar to those for CoCrPt film or CoCrPt alloy film, according to one embodiment. When the various materials were studied for the doping materials, oxides of B, Ti, and V were particularly effective in forming crystal grains in the $[Co/Pt]_n$ multilayered film, according to various embodiments.

The thickness of the $[Co/Pt]_n$ multilayered film part, which is the high-$H_k$ magnetic layer, may be preferably at least 1.0 nm, and no more than 2.5 nm, according to one embodiment. Of course, other thicknesses are possible. If the high-$H_k$ magnetic layer is thicker, recording becomes difficult. Conversely, if thinner, the stability of the recording magnetization state is inadequate in noise such as thermal energy.

The $[Co/Pt]_n$ multilayered film may be obtained by alternately forming a Co sub-layer with the Co element as a main component and a Pt sub-layer with the Pt element as a main component, according to one embodiment. The layered structure may be determined based on the premise that the largest possible $H_k$ is obtained, and the granular structure forms easily. Based on studies, in order to obtain a large $H_k$, the lamination period (sum of the thicknesses of the Co sub-layer and the Pt sub-layer) may be at least 0.4 nm to no more than 0.7 nm, and preferably, at least 0.5 nm to no more than 0.7 nm, according to one embodiment. Of course, other lamination periods are possible. In addition, the thickness of the Pt sub-layer may be thinner than the thickness of the Co sub-layer, preferably, at least 0.15 nm to no more than 0.3 nm, according to one embodiment. According to studies, the boundaries of the magnetic fine grains more easily form as the thickness of the Pt sub-layer becomes thinner, according to one embodiment. If the thickness of the Pt sub-layer is set in the specified range, the preferred granular structure as a recording medium is obtained.

When the lamination period of the $[Co/Pt]_n$ multilayered film was set to 0.6 nm, the range of the thickness of the $[Co/Pt]_n$ multilayered film corresponds to setting the lamination frequency from 2 to 4.

Preferably, the thickness of the CoCrPt film or the CoCrPt alloy film, which is the low-$H_k$ magnetic layer, may be from 10 nm to 16 nm, according to one embodiment. If the CoCrPt film or the CoCrPt alloy film is thinner, the completion of the magnetization reversal of the high-$H_k$ magnetic layer becomes difficult, and the desired recording is generally not possible or difficult to obtain.

Also, in the CoCrPt film or the CoCrPt alloy film, preferably, the grain boundary width on the medium surface side may be preferably smaller than the grain boundary width on the substrate side, according to one embodiment. In this structure, appropriate control of the exchange coupling between the magnetic fine grains is possible at locations on the medium surface side having a small grain boundary width. Thus, the recording and playback characteristics are improved.

In order to realize advanced recording and playback performance, attention should be paid particularly to the magnetic separation of the magnetic fine grains in the $[Co/Pt]_n$ multilayered film, which is the high-$H_k$ magnetic layer, according to one embodiment. Firstly, the $[Co/Pt]_n$ multilayered film has a major influence on the magnetization reversal process, and the exchange coupling acting on a portion of the $[Co/Pt]_n$ multilayered film between the magnetic grains easily causes deterioration in the recording characteristics. Secondly, because the magnetization of the $[Co/Pt]_n$ multilayered film is greater than that of the CoCrPt film or the CoCrPt alloy film, it is relatively difficult to reduce the exchange coupling acting between the grains. Thirdly, the $[Co/Pt]_n$ multilayered film is positioned in the lower part of the magnetic recording layer, therefore, incomplete crystal boundaries in the film are easily formed.

The design of the intermediate layer promotes the formation of grain boundaries in the $[Co/Pt]_n$ multilayered film, which is positioned in the lower part of the magnetic recording layer. In addition, because the intermediate layer has the role of controlling the crystal structure of the magnetic recording layer, the intermediate layer should be determined based on the compatibility of the crystal structure and the crystal orientation in the magnetic recording layer. The Ru layer adopted in the intermediate layer of a known practical perpendicular magnetic recording medium may be applied to the recording medium, according to one embodiment, because of good compatibility with the $[Co/Pt]_n$ multilayered film. If the c-axis of the Ru layer having the hcp crystal structure is oriented perpendicular to the film surface, the fcc (111) direction of the $[Co/Pt]_n$ multilayered film is perpendicular to the film surface, and a preferred structure for the recording medium, according to one embodiment, is obtained. In addition, as is well known, Ru has a high melting point, therefore, when the polycrystalline thin film of Ru is fabricated, fine surface depressions and bumps are produced by the Ru crystal grains. The surface depressions and bumps become the starting points for crystal nucleus formation in the granular structure and promote the formation of the granular structure.

However, as described above, it is difficult to reduce the exchange coupling between grains in the $[Co/Pt]_n$ multilayered film. Therefore, the boundary structure is believed to be improved by inserting a thin film (hereinafter, referred to as the onset layer) which mixes an alloy having the Ru element as the main ingredient and an oxide in the lower part of the magnetic recording layer, according to one embodiment. When the oxide is doped in the Ru alloy, a granular structure similar to the magnetic recording layer is obtained. Stimulated by the granular structure, the formation of crystal grain boundaries is further promoted in the magnetic recording layer. In this case, for example, $TiO_2$ is an effective oxide, according to one embodiment.

In addition, positioning a different CoCrPt or CoCrPt alloy film with a granular structure on the substrate side of the $[Co/Pt]_n$ multilayered film, which is the high-$H_k$ magnetic layer, is also possible, according to one embodiment. The $H_k$ of this CoCrPt or CoCrPt alloy film is small and does not strongly participate in the recording characteristics. However, the crystal boundaries in the $[Co/Pt]_n$ multilayered film are reliably formed and participate in the increase of the thermal stability factor KuV/kBT.

In the perpendicular magnetic recording medium, according to one embodiment, the $[Co/Pt]_n$ multilayered film having a large $H_k$ and the CoCrPt film or the CoCrPt alloy film having a relatively small $H_k$ are connected while good crystal orientation and the magnetic separation between magnetic crystal grains are maintained, and a granular magnetic recording layer having an ECC structure may be fabricated, according to one embodiment. Furthermore, by setting the thicknesses of the high-$H_k$ magnetic layer and the low-$H_k$ magnetic layer in the appropriate ranges described herein, the preferred recording and playback performance for an ECC medium may be implemented. Therefore, increasing the degree of magnetic separation between the magnetic crystal grains in the high-$H_k$ magnetic layer composed of the $[Co/Pt]_n$ multilayered film is used. A structure having incomplete grain boundaries may be suppressed in the magnetic recording layer by using the appropriate dopants and intermediate layer presented, according to one embodiment.

The ECC medium of one embodiment has a large $H_k$ difference in the magnetic recording layer and easily induces incoherent magnetization reversal compared to the ECC medium proposed previously. Consequently, recording bits having higher resistance to thermal oscillations may be formed as the magnetized information by a write magnetic field having the same magnitude as in the past. If there is a margin in the resistance to thermal oscillations, by reducing the surface area or the thickness of the magnetic crystal grains, the magnetization reversal in the magnetic recording layer may be accurately controlled in smaller reversal units, and a perpendicular magnetic recording medium appropriate to high-density magnetic recording may be obtained, according to one embodiment.

In order to increase the recording surface density in an HDD, in one approach, the recording magnetic pole of the magnetic head should be minimized, according to one embodiment. In this case, the maximum magnetic field generated by the magnetic head decreases. The perpendicular magnetic recording medium, according to one embodiment, is useful because good recording and playback characteristics are maintained even in a relatively small write magnetic field, and the recording capacity of the HDD further expands.

Specific embodiments and effects of the present invention are described below with reference to drawings of the embodiments. These embodiments are explained with the objective of illustrating the general principle of the present invention, but do not limit the present invention.

EXPERIMENTS

Figure 1:
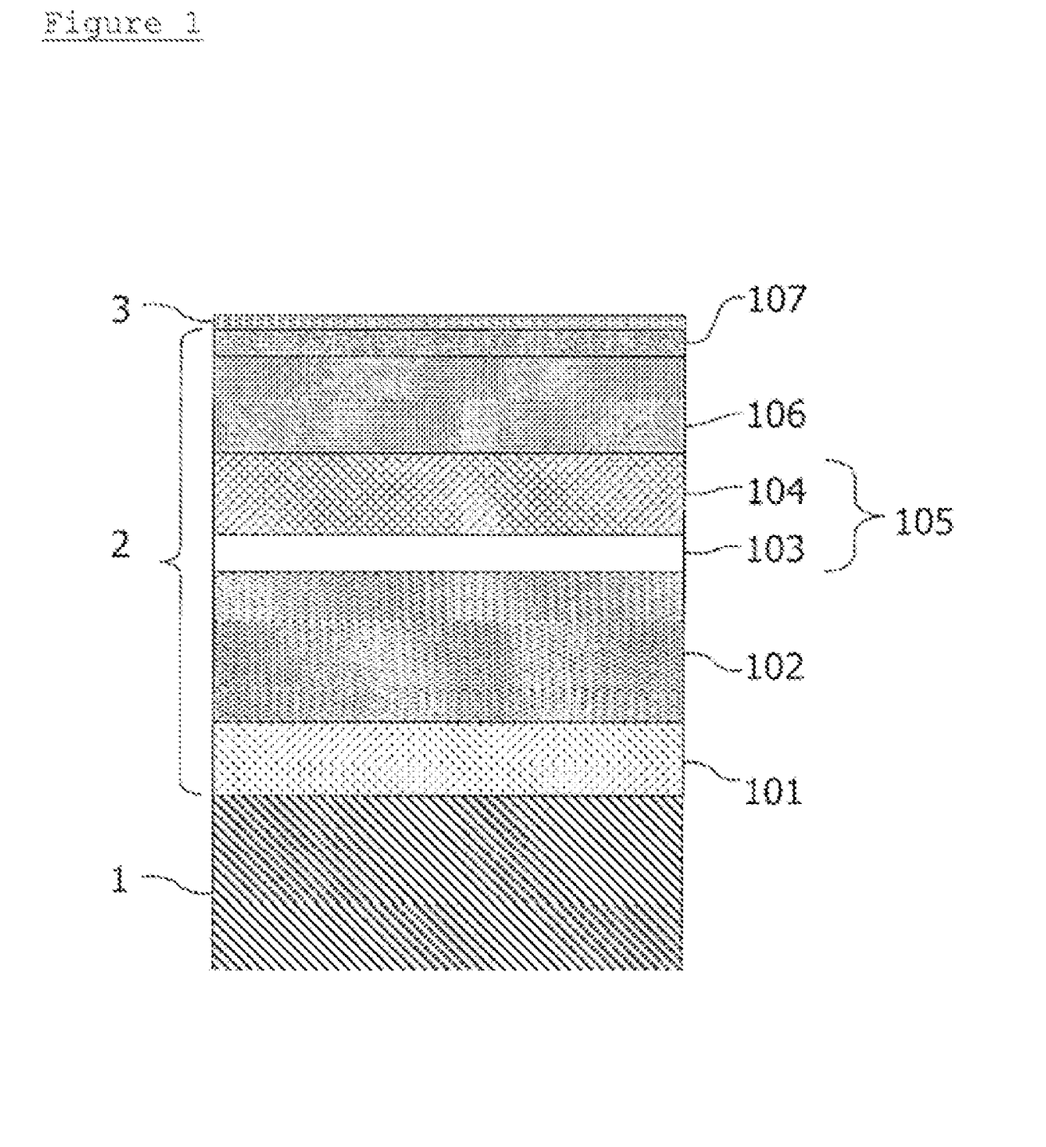
FIG. 1 is a cross-sectional view of the layered structure of the magnetic recording medium, according to one embodiment.

FIG. 1 is a general cross-sectional view of the structure of the magnetic recording medium fabricated in one embodiment. A washed reinforced glass substrate 1 for the magnetic disk was inserted in a vacuum chamber, and a magnetic recording film 2 was formed by a DC sputtering method. The magnetic recording film 2 was formed by sequentially layering a plurality of thin films including a magnetic recording layer 106, and was fabricated by using an in-line sputtering device. Initially, to ensure the adhesion of the entire magnetic recording film 2 to the glass substrate 1, a $NiTa_{38}$ target (the numerical subscript is the atomic percent of the element content rate, same hereinafter) was used to vapor deposit a 30-nm thick NiTa amorphous alloy layer 101. Next, a $FeCo_{34}Ta_{10}Zr_5$ target was used to deposit a 15-nm thick soft magnetic amorphous film, a Ru target to deposit a 0.6-nm thick anti-ferromagnetic binder film, and an $FeCo_{34}Ta_{10}Zr_5$ target to deposit a 30-nm thick soft magnetic amorphous film to form a soft magnetic backing layer 102 having a total of three layers. Furthermore, a $NiW_8$ target was used to deposit a 7-nm thick NiW alloy layer 103, followed by using a pure Ru target to deposit a 16-nm thick Ru layer 104. The NiW alloy layer 103 had an fcc structure with the (111) crystal direction oriented in the direction perpendicular to the film surface. The Ru layer 104 had an hcp structure with the (00.1) crystal direction oriented in the direction perpendicular to the film surface. The intermediate layer 105 was comprised of these two layers. When each layer was deposited, a pure Ar gas was used as the process gas. The Ar gas pressure was set mainly to 1 Pa, but the Ar gas pressure was increased to 4.6 Pa only when the upper half (medium surface side) of the Ru layer 104 was deposited.

In the present embodiment, various magnetic recording layers 106 were formed on the intermediate layer 105 described above and tested. The structure, thickness, and film deposition method of the magnetic recording layer are described later. After processing in a vacuum, a 3.5-nm thick protective film 107 was formed. The protective film 107 was formed by discharging the carbon target in the gas mixture of argon and nitrogen at the full pressure of 1.5 Pa with the nitrogen gas ratio set to 10%.

Furthermore, only in the samples of the magnetic recording medium for measuring the recording and playback, the glass substrate 1 was removed from the vacuum chamber after the magnetic recording film 2 was vapor deposited and coated with a PFPE liquid lubricating film 3 by dipping. Immediately before the evaluation of recording and playback, the surface was burnished to remove projections and contaminants, and a glide head confirmed beforehand that there were no particular problems in the head floating characteristics.

Figure 2:
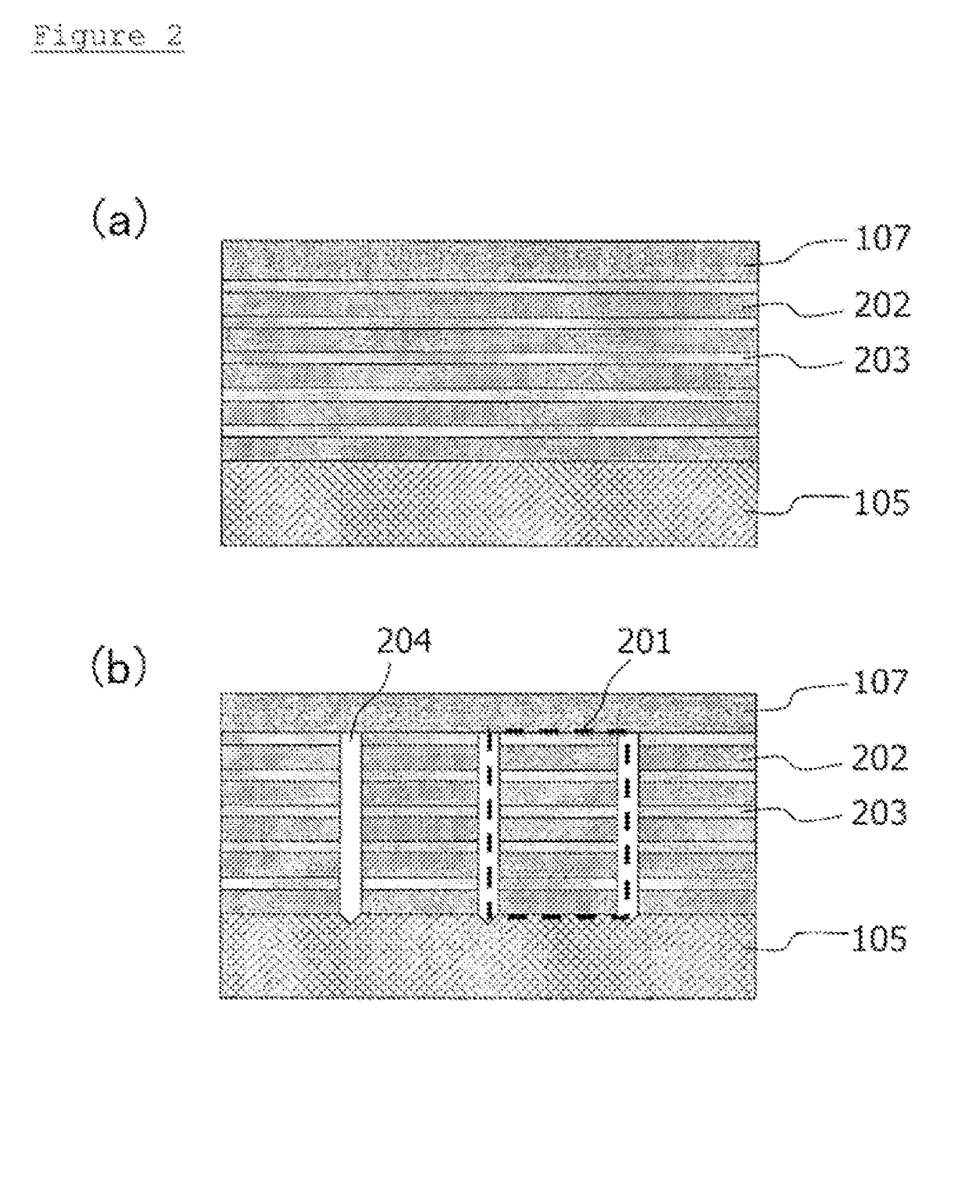
FIG. 2A shows a cross-sectional view of a multilayered film, according to one embodiment.
FIG. 2B shows a cross-sectional view of a multilayered film, according to one embodiment.

In one embodiment of the ECC structure, preferably, the anisotropic magnetic field $H_k$ of the $[Co/Pt]_n$ multilayered film is large. Therefore, first, the layered structure of a $[Co/Pt]_n$ multilayered film exhibiting a large $H_k$ was examined. FIG. 2 shows a simplified structure of the $[Co/Pt]_n$ multilayered film. FIG. 2A shows a film having a continuous structure which is obtained when the grain boundary material is not doped. FIG. 2A shows the film of the granular structure which is obtained when the film is deposited with the grain boundary material on the intermediate layer having surface bumps and depressions under the appropriate process conditions. Each magnetic fine grain 201 has a granular structure of alternately laminated Co sub-layers 202 and Pt sub-layers 203. Samples were fabricated with the magnetic recording layer 106 described above as the film having the continuous structure as shown in FIG. 2A. In order to evaluate by using a magnetometer, these samples were fabricated without the soft magnetic backing layer 102.

Figure 3:
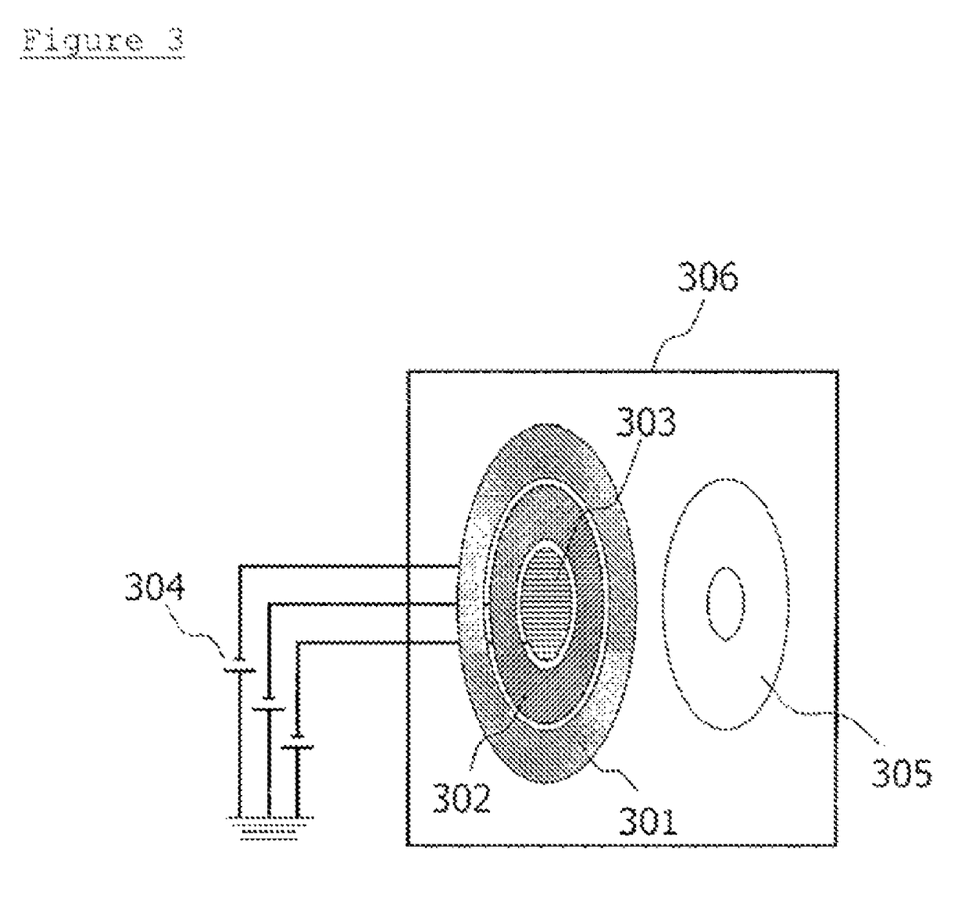
FIG. 3 illustrates a multiple cathode system for forming a multilayered film, according to one embodiment.

According to one embodiment, the $[Co/Pt]_n$ multilayered film was fabricated by using a sputtering method which alternately uses the pure Co target and the pure Pt target. The multiple cathode shown in FIG. 3 was used as the means for alternately sputtering the two materials. The pure Pt targets were affixed to the inner circumferential region and the outer circumferential region of the three independent cathodes arranged in concentric circular shapes, and the pure Co target was affixed to the center region. The desired periodic structure was obtained by using a controller to appropriately control the applied sputtering power to each target. The time required to form one period was approximately 0.5 seconds, and approximately 10 seconds were needed to form 20 periods, according to one embodiment.

Figure 4:
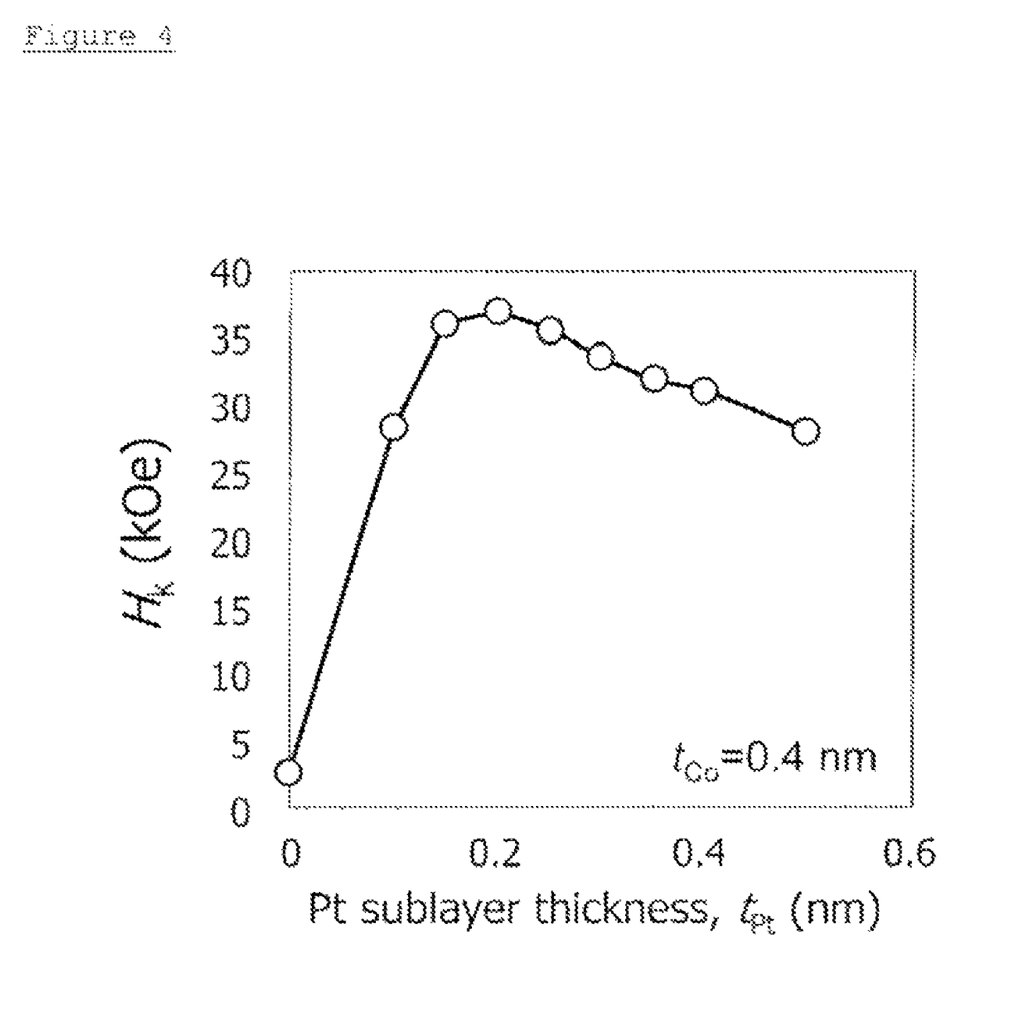
FIG. 4 is a graph showing the relationship between an anisotropic magnetic field $H_k$ and the thickness of a sublayer of a multilayered film, according to one embodiment.

FIG. 4 shows the relationship between the anisotropic magnetic field $H_k$ and the Pt sub-layer thickness of the $[C_oPt]_n$ multilayered film fabricated with the thickness of the Co sub-layer fixed at 0.4 nm, according to one embodiment. By inserting a thin Pt sub-layer, $H_k$ was drastically increased, and a sufficiently large $H_k$ was obtained for a Pt sub-layer thickness of 0.15 nm. $H_k$ was measured at 37 kOe, which was the maximum value at approximately 0.2 nm, and gradually decreased for higher thicknesses of the Pt sub-layer. Because the thickness of a one-atom layer of Pt metal crystal is approximately 0.22 nm, a sufficiently strong magnetic anisotropy may be obtained by only a one-atom layer, according to one embodiment.

Figure 5:
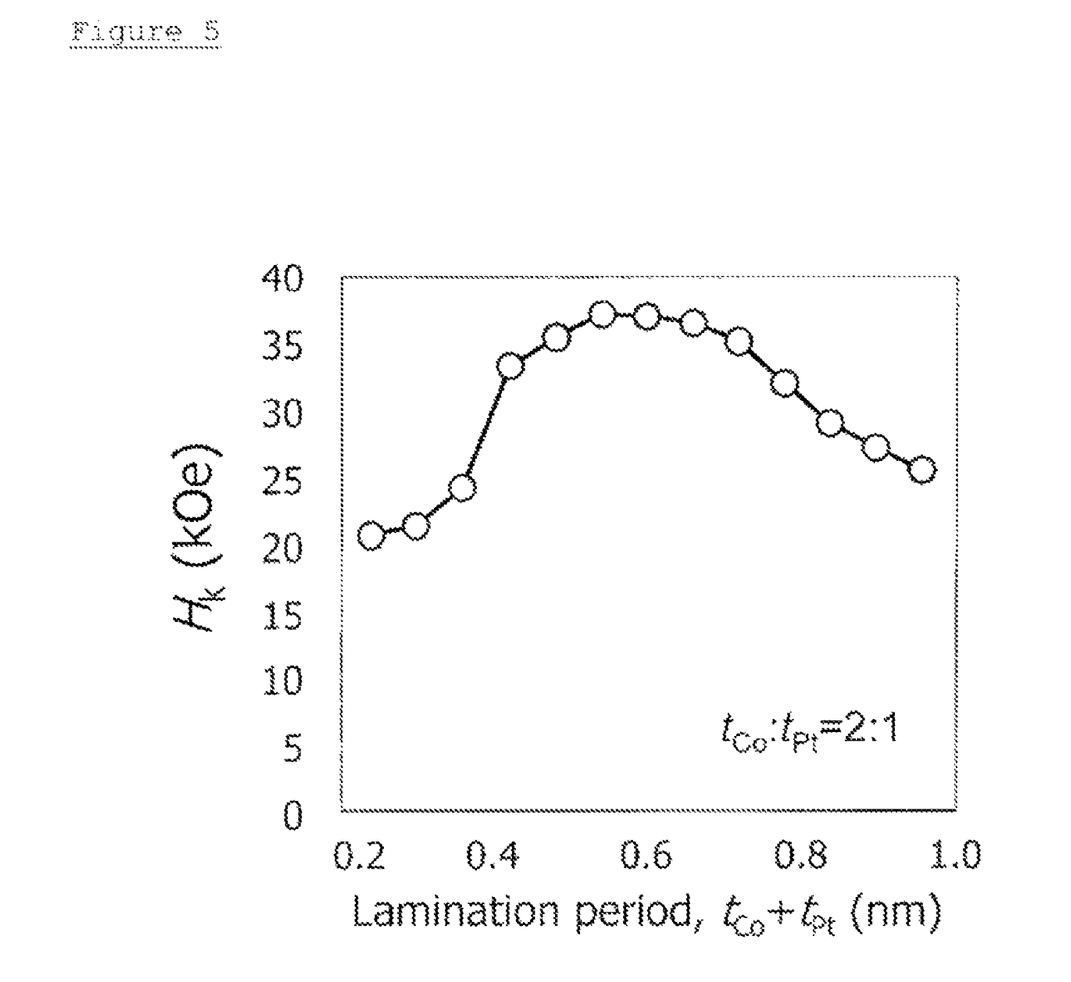
FIG. 5 is a graph showing the relationship between the anisotropic magnetic $H_k$ and the duration of a lamination period, according to one embodiment.

Next, the thickness ratio of the Co sub-layer and the Pt sub-layer were fixed at 2:1, and the changes in $H_k$ caused by the lamination period (sum of the thicknesses of the Co sub-layer and the Pt sub-layer) were investigated. The results are shown in FIG. 5. The region where the decrease in $H_k$ is small is a region where the lamination period is at least 0.4 nm and no more than 0.7 nm, according to one embodiment. When the lamination period is at least 0.5 nm and no more than 0.7 nm, the maximum $H_k$ occurs, according to one embodiment. More preferably, the lamination period is set in this region. In addition, when less than 0.4 nm, $H_k$ dropped markedly.

Figure 6:
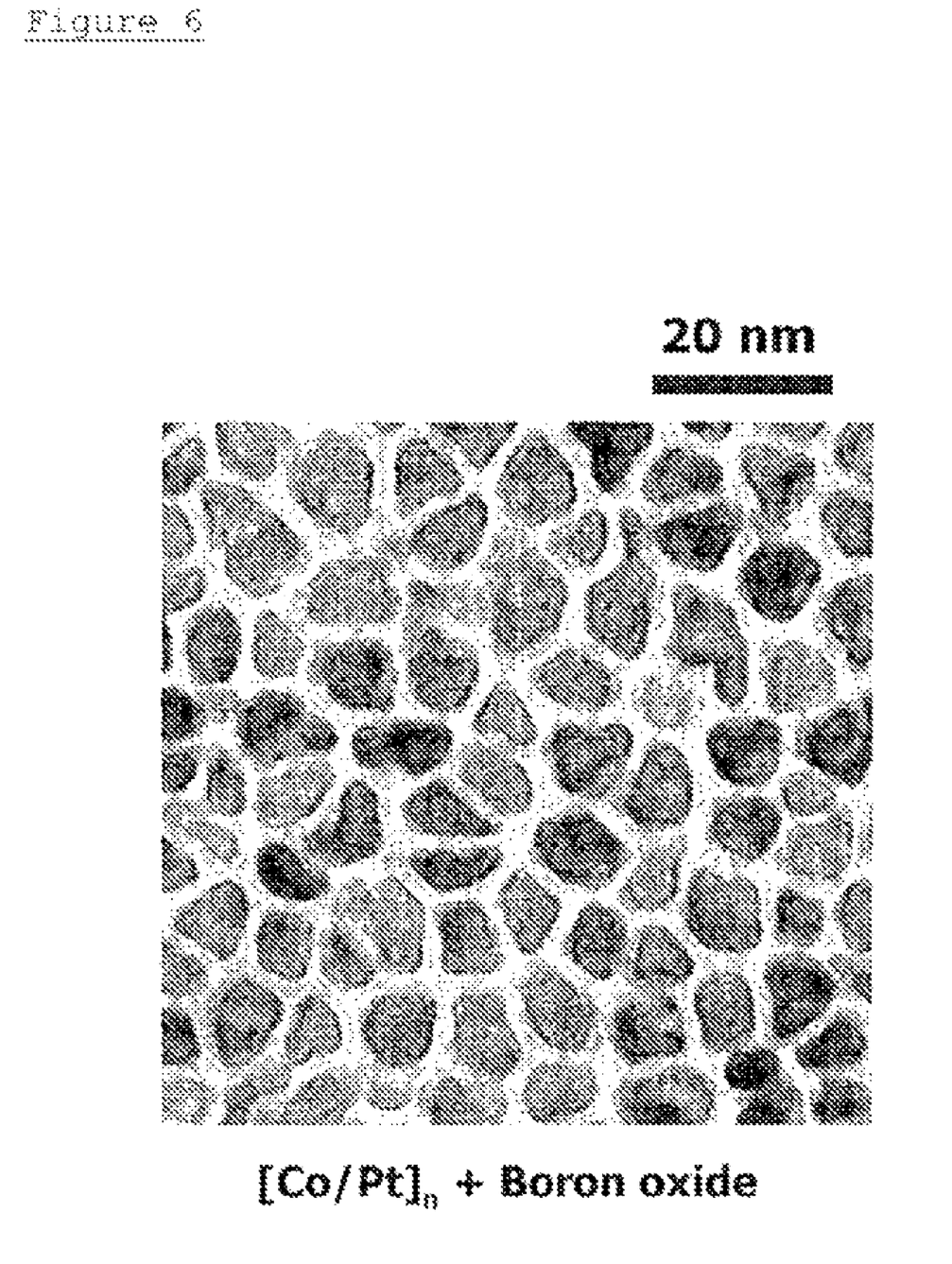
FIG. 6 is a TEM micrograph illustrating the structure of a multilayered film, according to one embodiment.

Next, the method for forming a [Co/Pt]$_n$ multilayered film having a granular structure as shown in FIG. 2A was investigated. Considering the preferred layered structure described above, the thickness of Co sub-layer and the thickness of Pt sub-layer were set to 0.4 nm and 0.2 nm, respectively. Instead of a pure Co target, a $(CoB_{10})_{98}$-$(CoO_2)_2$ alloy target containing 10 at. % of B in Co and 2 mol % of Co oxide ($CoO_2$) was used and alternately discharged with the pure Pt target to fabricate the [Co/Pt]$_n$ multilayered film. At this time, a minute amount of oxygen was added to the sputtering gas. Under these conditions, an oxide was also supplied to the interior of the [Co/Pt]$_n$ multilayered film during film deposition, and the crystal boundaries composed of oxide could be formed. When the microstructure of the fabricated [Co/Pt]$_n$ multilayered film was observed under a transmission electron microscope, a good granular structure as shown in FIG. 6 was verified. Furthermore, when an X-ray diffraction device was used to conduct a θ-2θ scan, a diffraction peak was observed near 92°. This is the diffraction line caused by the (00.1) surface of the Ru layer having an hcp structure and the (111) surface of the [Co/Pt]$_n$ multilayered film having an fcc structure. The (00.1) crystal direction of the Ru layer and the (111) crystal direction of the [Co/Pt]$_n$ multilayered film are oriented in the directions perpendicular to the film surface.

The cobalt oxide in the $(CoB_{10})_{98}$-$(CoO_2)_2$ alloy target is not chemically stable, and separates into oxygen and cobalt during sputtering. The separated oxygen mainly combines with the boron to become boron oxide. This is believed to be the main component in the oxides precipitated at the crystal boundaries. In the studies by the inventors, the structure in FIG. 6 may be obtained by Ti and V in addition to boron. These are also materials which easily produce oxygen and oxides separated from the Co oxides.

When a magnetometer was used to evaluate the magnetic characteristics of one embodiment of the [Co/Pt]$_n$ multilayered film, the anisotropic magnetic field $H_k$ of the magnetic film was 29.2 kOe; the coercive force Hc was 15.4 kOe; and the saturated magnetization Ms was 650 emu/cm. $H_k$ was low compared to the [Co/Pt]$_n$ multilayered film having the continuous structure, but was sufficiently large compared to the value obtained by a conventional CoCrPt or CoCrPt alloy film.

According to studies, sometimes the granular structure could not be formed depending on the layered structure of the [Co/Pt]$_n$ multilayered film. These cases were when the thickness of the Pt sub-layer was larger than 0.3 nm, or when the lamination period was greater than 0.8 nm. In this case, it was difficult to greatly reduce $H_k$ and obtain a large coercive force Hc when a decrease in the exchange coupling acting between magnetic fine grains was designed.

Next, the ECC structure was applied to the magnetic recording layer 106 of the magnetic recording medium shown in FIG. 1. The results of a detailed study of the relationship of that layered structure and the recording and playback characteristics are described. Below, the fabricated magnetic recording media having the ECC structure are divided into the three groups of A, B, and C, and each is explained in order.

Figure 7:
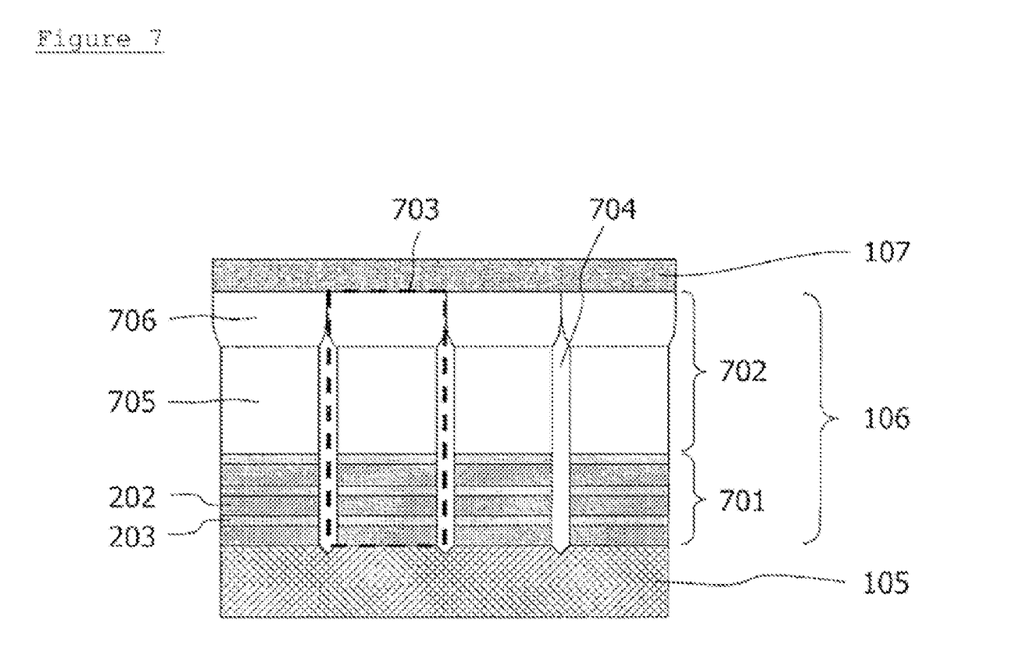
FIG. 7 is a cross-sectional view of a magnetic recording layer having an ECC structure, according to one embodiment.

In the group A media embodiments, a high-$H_k$ magnetic layer 701 comprising a [Co/Pt]$_n$ multilayered film and a low-$H_k$ magnetic layer 702 comprising a CoCrPt or CoCrPt alloy film were layered to form the magnetic recording layer 106 shown in FIG. 7. The magnetic recording layer 106 has a granular structure, according to one embodiment. The formation positions of the grain boundaries 704 are connected at the high-$H_k$ magnetic layer 701 and the low-$H_k$ magnetic layer 702. As a result, the magnetic fine grains 703 have the columnar structure of the high-$H_k$ magnetic layer 701 and the low-$H_k$ magnetic layer 702 joined in the direction perpendicular to the film surface, according to one embodiment.

The fabrication method of the [Co/Pt]$_n$ multilayered film, which is the high-$H_k$ magnetic layer 701, is as described above. Although thinner compared to the [Co/Pt]$_n$ multilayered film in FIG. 2, it has a granular structure, and the anisotropic magnetic field $H_k$ is large at 29 kOe, approximately. In this embodiment, the first layer in the [Co/Pt]$_n$ multilayered film was set to a Co sub-layer. However, according to separate studies, entirely identical effects are obtained even if the initial layer is the Pt sub-layer, according to one embodiment. The lamination order of the Co sub-layer and the Pt sub-layer does not matter. In addition, one [Co/Pt]$_n$ multilayered film may be a structure having a Co sub-layer (Pt sub-layer) in both the first and last layers which is one more layer of the Co sub-layer (Pt sub-layer). Furthermore, in one [Co/Pt]$_n$ multilayered film, the thicknesses of the Co sub-layer and the Pt sub-layer do not have to always be uniform. In one preferred embodiment, the thickness of each Co sub-layer and Pt sub-layer is set in a range which satisfies the lamination period and the Pt sub-layer conditions described above.

In one embodiment, the low-$H_k$ magnetic layer 702 was formed from two CoCrPt or CoCrPt alloy films having different compositions. A first low-$H_k$ magnetic layer 705 adjacent to the high-$H_k$ magnetic layer 701 was deposited by using a composite target of $CoCr_{21}Pt_{18}$-$SiO_2$ (8 mol %) including 8 mol % of $SiO_2$. A mixed gas of Ar and oxygen was used as the process gas, the total pressure was 4 Pa, and the oxygen gas ratio was 4 mol %. The film deposition rate was set to 3 nm/s, and a bias voltage of −200 V was applied to the disk. A second low-$H_k$ magnetic layer 706 was fabricated by using a $CoCr_{14}Pt_{14}B_8$ target doped with boron in the CoCrPt or CoCrPt alloy. In the formation, Ar gas at 0.6 Pa was used as the process gas, and the film deposition rate was 1.5 nm/s. In the above fabrication process, the grain boundaries of the low-$H_k$ magnetic layer 702 were formed along the boundaries formed by the high-$H_k$ magnetic layer 701. When observed by using a transmission electron microscope, the grain boundary positions coincided well between the magnetic layers. In addition, in contrast to the distinct crystal boundaries formed by the precipitation of $SiO_2$ in the first low-$H_k$ magnetic layer 705, a relatively smaller boundary width occurred in the second low-$H_k$ magnetic layer 706. The second low-$H_k$ magnetic layer 706 adjusts the exchange coupling between grains in the magnetic recording layer 106 to improve the recording and playback characteristics, and is set with the objective of increasing the smoothness of the medium surface to improve the head floating characteristics, and is often referred to as the cap layer. In the present embodiment, it is not essential for the low-$H_k$ magnetic layer 702 to be constructed from a plurality of magnetic layers, but may be constructed from one magnetic layer having the appropriate exchange coupling between grains and surface smoothness.

According to one embodiment, when the CoCrPt film was θ-2θ scanned by using an X-ray diffraction device after film deposition, a strong diffraction peak was observed near 94.5°. This is known to be the diffraction peak caused by the (00.1) surface of the CoCrPt film having an hcp structure, and the (00.1) crystal direction of the CoCrPt film oriented in the direction perpendicular to the film surface. In addition, the fabricated medium was sliced in the cross-sectional direction. A transmission electron microscope was used to observe the cross-section image. It was confirmed that the grain boundaries 704 extend in the piercing direction of the magnetic recording layer 106, and the grain boundaries 704 connect the high-$H_k$ magnetic layer 701 and the low-$H_k$ magnetic layer 702. Furthermore, when a high-resolution lattice image was observed, the parts where the Co sub-layer and the Pt sub-layer were alternately arranged at positions in the high-$H_k$ magnetic layer 701 could be measured.

In one embodiment, when first low-$H_k$ magnetic layer 705 and the second low-$H_k$ magnetic layer 706 were individually deposited and the anisotropic magnetic field $H_k$ was separately measured, the $H_k$s of the first and second low-$H_k$ magnetic layers were 19 kOe and 13 kOe, respectively, and sufficiently smaller than 29 kOe, which was the $H_k$ of the high-$H_k$ magnetic layer 701. When the magnetization curves of the entire magnetic recording layer 106 were evaluated, it was confirmed that the magnetization directions of both layers coincide before and after magnetization reversal. The reason is that the high-$H_k$ magnetic layer 701 and the low-$H_k$ magnetic layer 702 are adjacent, and sufficiently strong exchange coupling acts between the magnetic layers. In addition, the coercive force Hc was changed from 4.4 kOe to 6.2 kOe by the film thicknesses of the high-$H_k$ magnetic layer 701 and the low-$H_k$ magnetic layer 702.

In one embodiment, the recording media having the structure shown in FIG. 7 were fabricated when the thicknesses of the first and second low-$H_k$ magnetic layers were fixed at 10 nm and 4 nm, respectively, and the thickness of the [Co/Pt]$_n$ multilayered film, which was the high-$H_k$ magnetic layer 701, was changed. The thickness of the [Co/Pt]$_n$ multilayered film was changed depending on the lamination frequency. The ratio of the thicknesses of the Co sub-layer and the Pt sub-layer was fixed at 2:1, and the thickness of one lamination period was set to 0.5 nm, 0.6 nm, or 0.7 nm. The same magnetic head was used to compare and evaluate the recording and playback characteristics of these media. The main magnetic pole width of the recording element of the magnetic head was 80 nm, approximately. The magnetic head was a shielded head having a shield at the back end of the main magnetic pole. In addition, the playback element of the magnetic head was a tunnel magneto-resistive (TMR) element having an electrode gap of 50 nm, and a shield gap length of 35 nm. The rotational velocity of the disk was controlled so that the linear velocity for the magnetic head became 10 m/s. The flying height of the magnetic head was estimated to be 8 nm, approximately.

Figure 8:
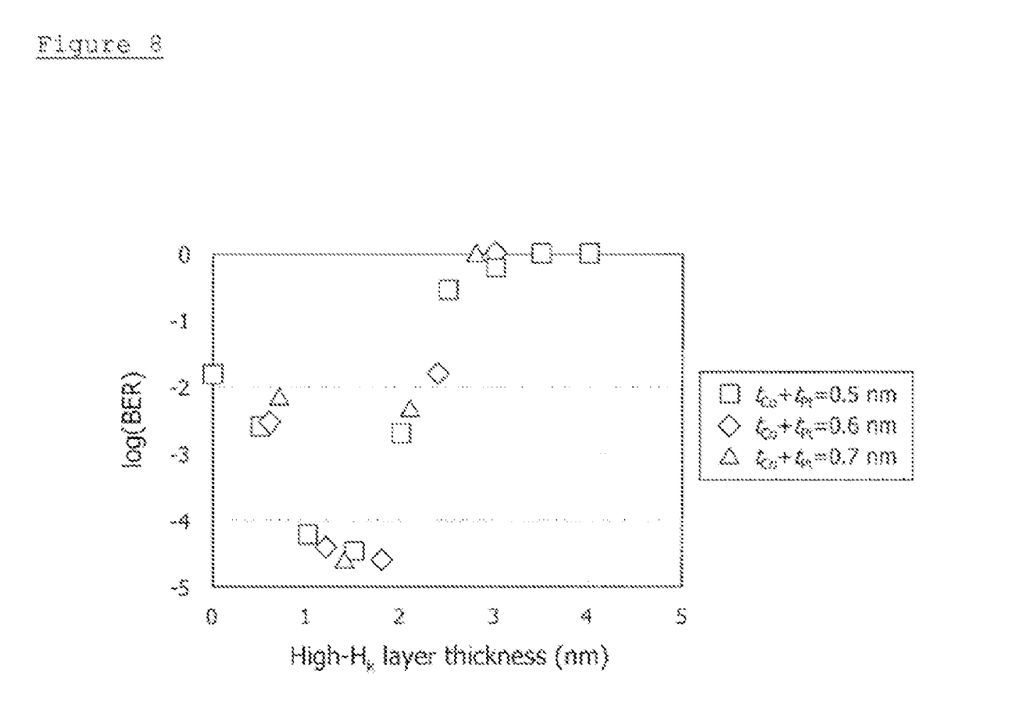
FIG. 8 is a graph showing the relationship between a bit error rate (BER) value of a magnetic recording medium and the thickness of a multilayered film in the same medium during recording and playback, according to one embodiment.

FIG. 8 shows the relationship between the bit error rate (BER) value when recording and playback were conducted at a line recording density of 55.1 kbit/mm (1400 kbpi) in the above-mentioned conditions and the thickness of the high-$H_k$ magnetic layer 701 in the recording media described above. Good performance was exhibited as a recording medium occurred for a thickness of the high-$H_k$ magnetic layer 701 from 1.0 nm to 1.8 nm. If the high-$H_k$ magnetic layer 701 was thicker, recording became difficult, and an increase in the overwrite value was observed. In addition, when the high-$H_k$ magnetic layer 701 was thin, recording was easy, but a high signal-to-noise strength could not be obtained.

Figure 9:
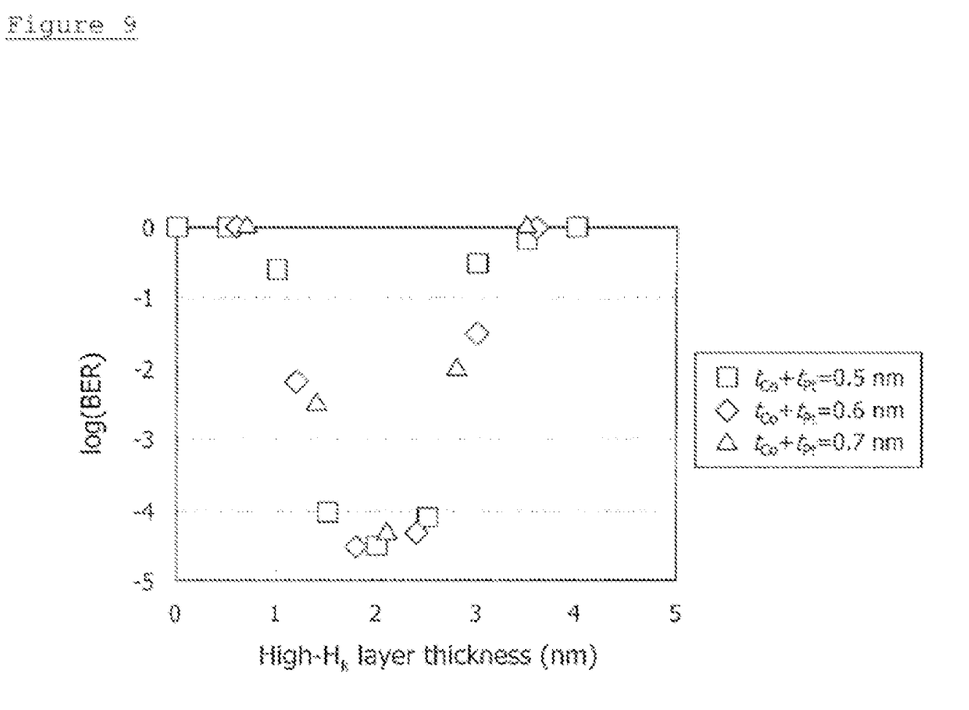
FIG. 9 is a graph showing the relationship between the bit error rate (BER) value of a magnetic recording medium and the thickness of a multilayered film in the same medium during recording and playback, according to one embodiment.

If the high-$H_k$ magnetic layer 701 is thicker and recording becomes a problem, a remedy is to decrease the $H_k$ of the low-$H_k$ magnetic layer 702 to facilitate starting magnetization reversal, according to one embodiment. Therefore, the media in group B were fabricated with the Pt composition ratio in the CoCrPt film of the first low-$H_k$ magnetic layer 705 set to 14 at. % and $H_k$ lowered to 15 kOe. The other parts were the same in group A and group B. FIG. 9 shows the results of evaluating the recording and playback characteristics of group B under the same conditions as FIG. 8. In group B, good performance as a recording medium was exhibited when the thickness of the high-$H_k$ magnetic layer 701 was from 1.5 nm to 2.5 nm. The reasons are the same as those for group A. If the high-$H_k$ layer is too thick, recording becomes difficult. If the high-$H_k$ layer is too thin, the recording state becomes unstable.

From the comparison results of embodiments of groups A and B, a thicker high-$H_k$ magnetic layer 701 was believed to be applicable by further lowering the anisotropic magnetic field $H_k$ in the low-$H_k$ magnetic layer 702. However, this test did not go well. When the $H_k$ of the structure which applied the $H_k$ of the low-$H_k$ magnetic layer 702 applied to group B was lowered, the recording and playback characteristics deteriorated substantially. The reasons may be the difficulty in stably maintaining the orientation of the magnetization of low-$H_k$ magnetic layer 702 in direction perpendicular to the film surface even when not recording (e.g., playing back the magnetic signal), and no longer functioning normally as the perpendicular magnetic recording layer.

Figure 10:
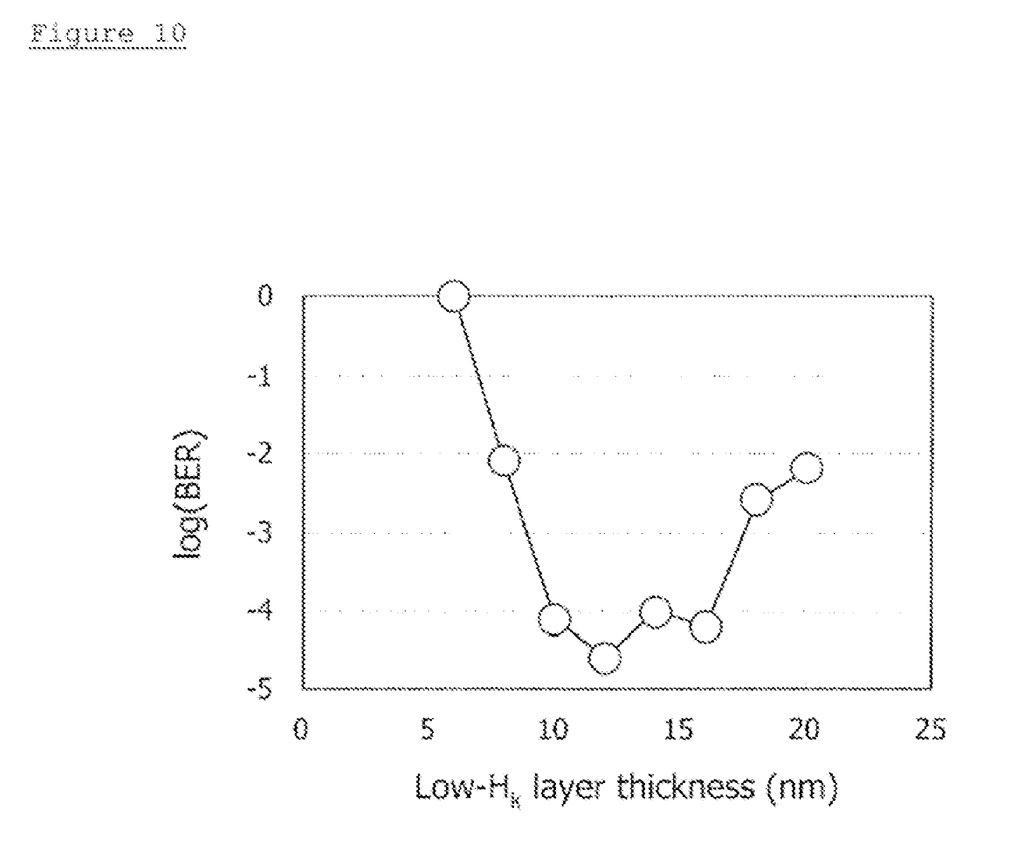
FIG. 10 is a graph showing the relationship between the bit error rate (BER) value of a magnetic recording medium and the thickness of a film in the same medium during recording and playback, according to one embodiment.

In the group C media, samples were fabricated when the thickness of the high-$H_k$ magnetic layer 701 was fixed at 1.8 nm ([Co/Pt]$_n$ multilayered film has 3 periods) and the thickness of the low-$H_k$ magnetic layer 702 was changed. The low-$H_k$ magnetic layer 702 was constructed from first and second low-$H_k$ magnetic layers, and the anisotropic magnetic fields $H_k$ were approximately 19 kOe, and approximately 13 kOe, respectively, similar to the group A. With the film thickness ratio of the first and the second low-$H_k$ magnetic layers fixed at 5:2, the film thickness of the entire low-$H_k$ magnetic layer 702 was varied from 6 nm to 20 nm. FIG. 10 shows the results of the evaluation of the recording and playback characteristics of group B under the same conditions as FIGS. 8 and 9. When the film thickness of the low-$H_k$ magnetic layer 702 was at least 10 nm and no more than 16 nm, good recording and playback performance was demonstrated.

In one embodiment, if the film thickness of the low-$H_k$ magnetic layer 702 was less than 10 nm, the problems were the appearance of behavior such as an increase in the overwrite value and the difficulty in recording. The main reasons for the difficulty in recording are believed to be the reduction in the amount of magnetization of the low-$H_k$ magnetic layer 702 and the inadequate reversal of the magnetization of the high-$H_k$ magnetic layer 701, or the entire magnetic recording layer becomes too thin and incoherent magnetization reversal is difficult to induce. In addition, the tendency of the coercive force to decrease for a thin low-$H_k$ magnetic layer 702 was exhibited. This means that the thermal stability factor KuV/kBT decreased due to the decrease in the volume of the magnetic fine grains, namely, the stability of the recording state was damaged. Conversely, if the film thickness of the low-$H_k$ magnetic layer 702 was larger than 16 nm, a tendency for the bit error rate to increase was exhibited because the signal-to-noise ratio and the recording resolution deteriorated. In addition, the tendency of slightly more difficulty in recording was exhibited. Because the entire magnetic recording layer thickened, the cause was assumed to be that the distance to the magnetic head and the high-$H_k$ magnetic layer 701 was too wide.

Medium #1, according to one embodiment, which was the 12-nm thick low-$H_k$ magnetic layer 702 in the group C media of this embodiment, was compared to a conventional medium which had an unchanged structure for the low-$H_k$ magnetic layer 702 and replaced the [Co/Pt]$_n$ multilayered film of the high-$H_k$ magnetic layer 701 with a CoCrPt film. By setting the anisotropic magnetic field $H_k$ of the CoCrPt film which replaced the [Co/Pt]$_n$ multilayered film to approximately 22 kOe and the thickness to 4.4 nm, the coercive force Hc of the conventional medium became 4.8 kOe, which closely matched the medium of the present invention. Table 1 shows the evaluation results of the recording and playback characteristics of the medium of the present invention and the conventional medium. In Table 1, when a 23.6 kbit/mm (600 kfci) signal is overwritten by a 2.76 kbit/mm (70 kfci) signal, the overwrite value is the ratio of the signal strength of the unerased component of the former and the signal strength of the latter. $S_{10T}/N_{1T}$ is the ratio of the signal strength $S_{10T}$ recorded at 6.30 kbit/mm (160 kfci) and the integrated medium noise strength $N_{1T}$ recorded at 63.0 kbit/mm (1600 kfci), according to one embodiment. The effectiveness of the media of the present invention was confirmed to (1) be easy to write regardless of a high coercive force (smaller overwrite value), and (2) to obtain an equivalent error rate although the recording track width recorded is substantially restricted. This may be caused by applying a [Co/Pt]$_n$ multilayered film having a large anisotropic magnetic field $H_k$ in the medium of the present invention.

TABLE 1

|  | Coercive Force (kOe) | Overwrite Value (dB) | $S_{10T}/N_{1T}$ (dB) | Bit Error Rate log (BER) | Recording Track Width (nm) |
| --- | --- | --- | --- | --- | --- |
| Medium #1 of the present invention | 4.9 | −28.2 | 23.3 | −4.6 | 84 |
| Medium for comparison | 4.8 | −25.9 | 23.0 | −4.4 | 95 |

Figure 11:
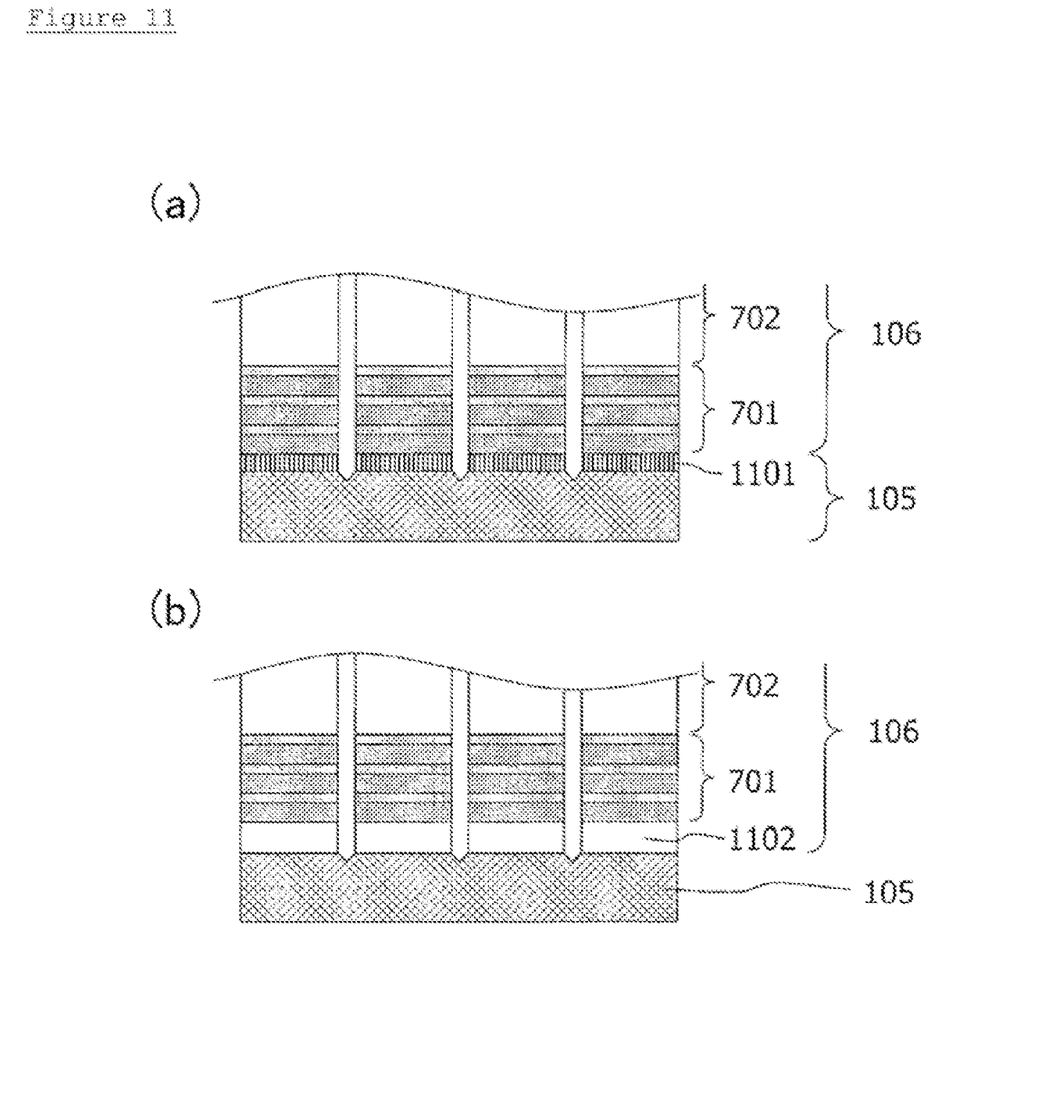
FIG. 11A is a cross-sectional view of a portion of a magnetic recording layer having an ECC structure, according to one embodiment.
FIG. 11B is a cross-sectional view of a portion of a magnetic recording layer having an ECC structure, according to one embodiment.

This embodiment illustrates the results of the improved magnetic separation of the magnetic fine grains in the magnetic recording layer by the introduction of an onset layer or the initial layer of the recording layer. The fabricated medium has the same basic structure of medium #1 of the present invention shown, according to one embodiment. The entire structure is shown in FIG. 1, according to one embodiment, and a partial cross-sectional view in FIG. 11 demonstrates an onset layer 1101 or an initial layer 1102 of the recording layer at locations where the intermediate layer 105 and the magnetic recording layer 106 are close.

FIG. 11A shows the layered structure of medium #2, according to one embodiment. The onset layer 1101 in the non-magnetic layer composed of Ru and Ti oxide was arranged as the final layer in the intermediate layer 105. After the Ru layer 104 was deposited, a RuTi$_{10}$ alloy target was used to fabricate a 1-nm thick RuTi alloy layer. Furthermore, the onset layer 1101 was obtained by introducing a minute amount of oxygen in the vacuum chamber to oxidize the Ti in the RuTi alloy. The magnetic recording layer 106 was formed in the same structure as medium #1 in the present invention. The fabricated onset layer 1101 is expected to have a granular structure where Ru microcrystals are enclosed by Ti oxides, and improved magnetic separation in the magnetic recording layer 106 formed on top.

FIG. 11B shows the layered structure of medium #3, according to one embodiment. Before forming the high-$H_k$ magnetic layer 701 in the magnetic recording layer 106, a 2-nm thick CoCrPt film was formed as the initial layer 1102 of the recording layer under the same film deposition conditions as the first low-$H_k$ magnetic layer 705 by using the CoCr$_{21}$Pt$_{18}$-SiO$_2$ (8 mol %) composite target. The CoCrPt film is an alloy film having a granular structure. Specifically, the magnetic recording layer 106 in this medium is composed of a total of four layers of the initial layer 1102 of the recording layer, the high-$H_k$ magnetic layer 701, the first low-$H_k$ magnetic layer 705, and the second low-$H_k$ magnetic layer 706. This structure is believed to promote magnetic separation in the high-$H_k$ magnetic layer 701 which is particularly important to the improvement of the recording and playback characteristics.

The recording and playback characteristics of media #2 and #3 above were evaluated by the same method. Table 2 compares these results and the results for medium #1. For media #2 and #3, compared to medium #1, a 2-dB lower signal-to-noise ratio and an approximately 0.5 improvement in the bit error rate were seen. Since the difference in the recorded track width is small, according to the results of this study, the surface recording density may be further improved by media #2 and #3, according to several embodiments.

TABLE 2

|  | Coercive Force (kOe) | Overwrite Value (dB) | $S_{10T}/N_{1T}$ (dB) | Bit Error Rate log (BER) | Recording Track Width (nm) |
| --- | --- | --- | --- | --- | --- |
| Medium #1 of the present invention | 4.9 | −28.2 | 23.3 | −4.6 | 84 |
| Medium #2 of the present invention | 5.1 | −27.3 | 25.1 | −5.2 | 82 |
| Medium #3 of the present invention | 5.1 | −27.8 | 24.9 | −5.1 | 84 |

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
   a magnetic recording layer formed above a substrate, the magnetic recording layer comprising:
      a first magnetic layer formed from a [Co/Pt]$_n$ multilayered film, wherein the first magnetic layer has a face-centered cubic (fcc) (111) crystal structure, the (111) direction being perpendicular to a film surface thereof; and
      a second magnetic layer formed above the first magnetic layer, the second magnetic layer being formed from a CoCrPt film or a CoCrPt alloy film, wherein the second magnetic layer has a hexagonal close packed (hcp) (00.1) crystal structure, the (00.1) direction being perpendicular to a film surface thereof.

2. The magnetic recording medium described in claim 1, wherein the first magnetic layer is formed on a substrate side of the magnetic recording layer opposite the second magnetic layer, and wherein the first magnetic layer and the second magnetic layer are exchange coupled.

3. The magnetic recording medium described in claim 2, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

4. The magnetic recording medium described in claim 2, wherein a thickness of the first magnetic layer is in a range from about 1.0 nm to about 2.5 nm.

5. The magnetic recording medium described in claim 4, wherein a thickness of the second magnetic layer is in a range from about 10 nm to about 16 nm.

6. The magnetic recording medium described in claim 5, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

7. The magnetic recording medium described in claim 4, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

8. The magnetic recording medium described in claim 2, wherein a thickness of the second magnetic layer is in a range from about 10 nm to about 16 nm.

9. The magnetic recording medium described in claim 8, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

10. The magnetic recording medium described in claim 1, wherein a thickness of the first magnetic layer is in a range from about 1.0 nm to about 2.5 nm.

11. The magnetic recording medium described in claim 10, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

12. The magnetic recording medium described in claim 10, wherein a thickness of the second magnetic layer is in a range from about 10 nm to about 16 nm.

13. The magnetic recording medium described in claim 12, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

14. The magnetic recording medium described in claim 1, wherein a thickness of the second magnetic layer is in a range from about 10 nm to about 16 nm.

15. The magnetic recording medium described in claim 14, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

16. The magnetic recording medium described in claim 1, wherein the first magnetic layer and the second magnetic layer include structures having magnetic fine grains separated by grain boundaries which comprise non-metallic materials, and wherein formation positions of the grain boundaries are consistent between the first magnetic layer and the second magnetic layer.

17. The magnetic recording medium described in claim 1, wherein the first magnetic layer has a lamination frequency in a range from about 0.4 nm to about 0.7 nm, and wherein a thickness of Pt sub-layers of the $[Co/Pt]_n$ multilayered film is in a range from about 0.15 nm to about 0.3 nm.

18. The magnetic recording medium described in claim 1, wherein a width of the grain boundary in the second magnetic layer is less on a medium side of the second magnetic layer than on a substrate side of the second magnetic layer.

19. The magnetic recording medium described in claim 1, wherein the second magnetic layer further comprises a Ru layer positioned on the substrate side of the second magnetic recording layer, and wherein a c-axis of the second magnetic layer is oriented perpendicular to the film surface thereof.

20. The magnetic recording medium described in claim 1, further comprising a thin film comprising an Ru-alloy mixed with a metal oxide positioned directly below the magnetic recording layer.

21. The magnetic recording medium described in claim 1, further comprising a CoCrPt film or a CoCrPt alloy film having a granular structure positioned above the substrate and below the substrate side of the first magnetic layer.

22. The magnetic recording medium described in claim 1, wherein the grain boundaries are formed from a metal oxide material.

23. The magnetic recording medium described in claim 22, wherein the grain boundaries in the first magnetic layer are formed of a metal oxide selected from a group consisting of: boron oxide, titanium oxide, or vanadium oxide.

24. A system, comprising:
a magnetic recording medium as described in claim 1;
at least one magnetic head for reading from and/or writing to the magnetic recording medium;
a magnetic head slider for supporting the at least one magnetic head; and
a control unit coupled to the at least one magnetic head for controlling operation of the at least one magnetic head.

* * * * *